United States Patent
Larsson

(10) Patent No.: US 10,343,680 B2
(45) Date of Patent: Jul. 9, 2019

(54) METHOD AND SYSTEM FOR DRIVING A MINING AND/OR CONSTRUCTION MACHINE

(71) Applicant: Atlas Copco Rock Drills AB, Orebro (SE)

(72) Inventor: Johan Larsson, Orebro (SE)

(73) Assignee: Epiroc Rock Drills Aktiebolag, Orebro (SE)

( * ) Notice: Subject to any disclaimer, the term of this patent is extended or adjusted under 35 U.S.C. 154(b) by 342 days.

(21) Appl. No.: 13/261,838

(22) PCT Filed: Nov. 15, 2012

(86) PCT No.: PCT/SE2012/051263
§ 371 (c)(1),
(2) Date: Apr. 8, 2014

(87) PCT Pub. No.: WO2013/074035
PCT Pub. Date: May 23, 2013

(65) Prior Publication Data
US 2014/0297135 A1   Oct. 2, 2014

(30) Foreign Application Priority Data
Nov. 18, 2011   (SE) ...................... 1151103

(51) Int. Cl.
*B60W 30/09*   (2012.01)
*B60T 7/22*    (2006.01)
(Continued)

(52) U.S. Cl.
CPC ............... *B60W 30/09* (2013.01); *B60T 7/22* (2013.01); *B60W 50/0097* (2013.01);
(Continued)

(58) Field of Classification Search
CPC ............ B60W 30/09; B60W 50/0097; B60W 2300/17; B60W 2500/30; B60T 7/22; B60T 2201/022; G08G 1/166; G08G 1/165
(Continued)

(56) References Cited

U.S. PATENT DOCUMENTS

| 4,069,888 A | 1/1978 | Wolters et al. |
| 4,465,155 A | 8/1984 | Collins |

(Continued)

FOREIGN PATENT DOCUMENTS

| DE | 102010025612 | 3/2011 |
| EP | 1533776 | 5/2005 |

(Continued)

OTHER PUBLICATIONS

Simultaneous path following and obstacle avoidance control of a unicycle-type robot 7(9) 2007 IEEE International Conference on Robotics and Automation (IEEE Cat No. 07CH37636D)—2007—IEEE—Piscataway, NJ, USA, 6 pp.

(Continued)

*Primary Examiner* — Redhwan K Mawari
*Assistant Examiner* — Rodney P King
(74) *Attorney, Agent, or Firm* — Mark P. Stone

(57) ABSTRACT

The present invention relates to a method for driving a mining and/or construction machine, where said machine is arranged to be controlled by an operator by means of maneuvering means, where said operator, when driving said machine, provides steering commands by means of said maneuvering means for maneuvering said machine. The method comprises, when said machine is being driven in an environment having at least a first obstacle:
when said machine is within a first distance from said first obstacle, estimate a first path that has been requested by said operator by means of said steering commands,
(Continued)

by means of a control system, determining whether said machine when moving according to said requested first path will be driven within a second distance from said first obstacle, and when it is determined that said machine, when travelling according to said first path, will be driven within said second distance from said first obstacle, retard said machine by means of said control system.

25 Claims, 8 Drawing Sheets

(51) Int. Cl.
  *G08G 1/16* (2006.01)
  *B60W 50/00* (2006.01)
(52) U.S. Cl.
  CPC ............ *G08G 1/165* (2013.01); *G08G 1/166* (2013.01); *B60T 2201/022* (2013.01); *B60W 2300/17* (2013.01); *B60W 2550/30* (2013.01)
(58) Field of Classification Search
  USPC ...................................................... 701/50, 98
  See application file for complete search history.

(56) References Cited

U.S. PATENT DOCUMENTS

| | | | |
|---|---|---|---|
| 5,881,832 A | 3/1999 | Zitz et al. | |
| 5,889,476 A | 3/1999 | Schmitz | |
| 5,999,865 A | 12/1999 | Bloomquist et al. | |
| 6,088,644 A * | 7/2000 | Brandt | E01C 19/004 172/4.5 |
| 6,134,502 A | 10/2000 | Sarangapani | |
| 6,328,116 B1 * | 12/2001 | Hurskainen | B25D 17/005 173/128 |
| 6,539,294 B1 * | 3/2003 | Kageyama | E02F 3/842 180/168 |
| 6,619,212 B1 * | 9/2003 | Stephan | B60L 13/006 104/290 |
| 6,694,233 B1 | 2/2004 | Duff et al. | |
| 2004/0036601 A1 * | 2/2004 | Obradovich | G08G 1/167 340/540 |
| 2004/0054434 A1 | 3/2004 | Sturges et al. | |
| 2004/0193351 A1 | 9/2004 | Takahashi et al. | |
| 2004/0193374 A1 | 9/2004 | Hac et al. | |
| 2007/0027612 A1 | 2/2007 | Barfoot et al. | |
| 2010/0127853 A1 * | 5/2010 | Hanson | G01S 5/0289 340/539.13 |
| 2010/0318263 A1 * | 12/2010 | Hayakawa | B60T 8/17557 701/41 |
| 2011/0066313 A1 * | 3/2011 | Larsson | G09B 29/005 701/25 |
| 2011/0254700 A1 * | 10/2011 | Gharsalli | G08G 1/166 340/904 |
| 2012/0035788 A1 * | 2/2012 | Trepagnier | B60W 30/00 701/3 |

FOREIGN PATENT DOCUMENTS

| | | |
|---|---|---|
| EP | 1609655 | 12/2005 |
| EP | 1742086 | 6/2006 |
| EP | 1912081 | 4/2008 |
| JP | 01282616 | 11/1989 |
| SE | 533009 | 5/2010 |
| WO | WO 9109275 | 6/1991 |
| WO | WO 01/07976 | 2/2001 |
| WO | WO 2004/086161 | 10/2004 |
| WO | WO 2007/012198 | 2/2007 |
| WO | WO 2009/145695 | 12/2009 |
| WO | WO 2010/149853 | 12/2010 |
| WO | WO 2011/092229 | 8/2011 |
| WO | WO 2011/141629 | 11/2011 |

OTHER PUBLICATIONS

An Evaluation of Local Autonomy Applied to Teleoperated Vehicles in Underground Mines Johan Larsson, Mathias Broxwall, Alessandro Saffiotti.

E. S. Duff, J. M. Roberts, and P. I. Corke. Automation of an underground mining vehicle using reactive navigation and opportunistic localization. In Australasian Conference on Robotics and Automation, Auckland, pp. 151-156.

Automation of an underground mining vehicle using reactive navigation and opportunistic localization Proceedings of the 2003 IEEE/RSJ International Conference on Intelligent Robots and Systems. (IROS 2003). Las Vegas, NV, Oct. 27-31, 2003; [IEEE/RSJ International Conference on Intelligent Robots and Systems],—Oct. 27, 2003; Oct. 27, 2003-Oct. 31, 2003—New York, NY : IEEE, US, 4, , 3775-3780.

F. von Hundelshausen, M. Himmelsbach, F. Hecker, A. Mueller, and H.-J. Wuensche. Driving with tentacles: Integral structures for sensing and motion. J. Field Robot.,25(9):640-673, 200.

* cited by examiner

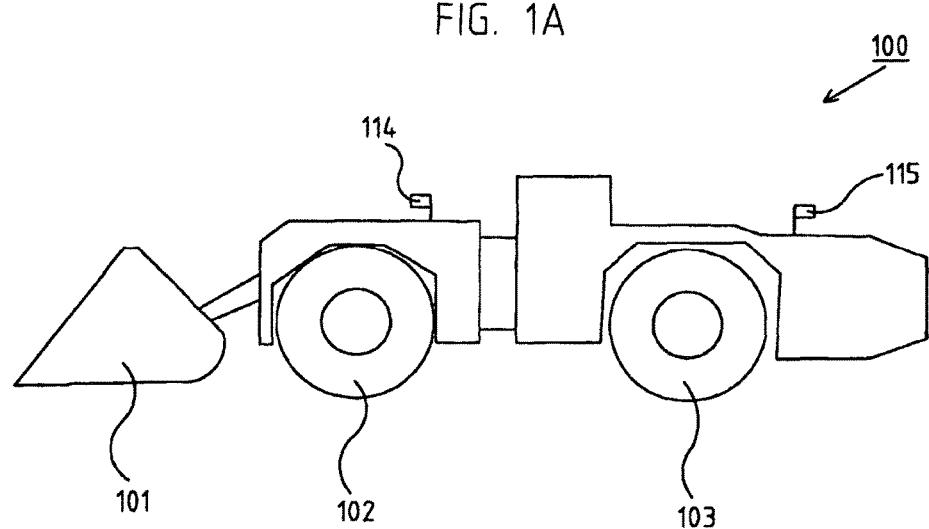
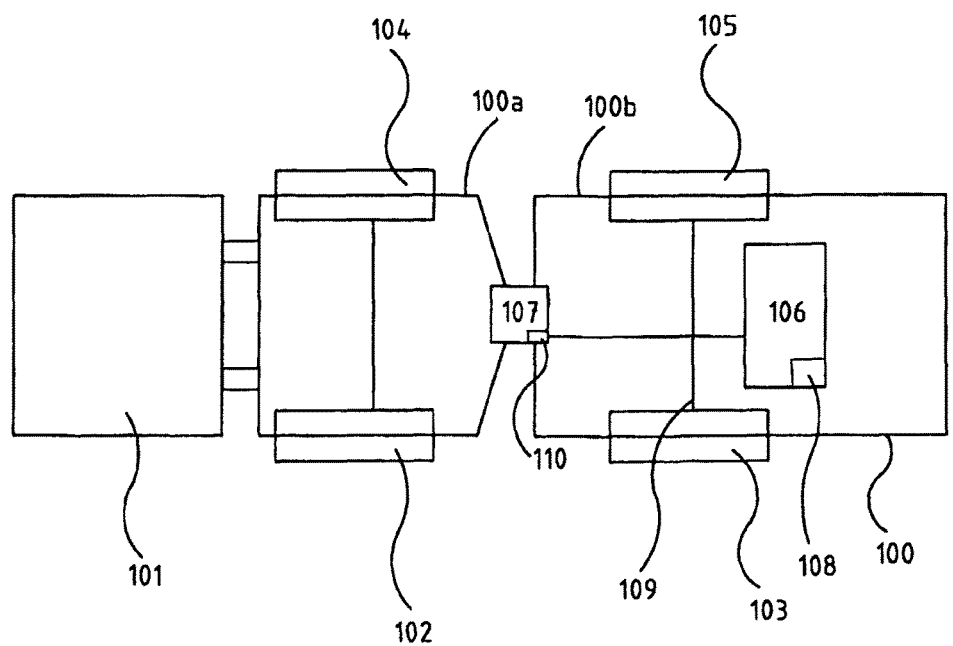

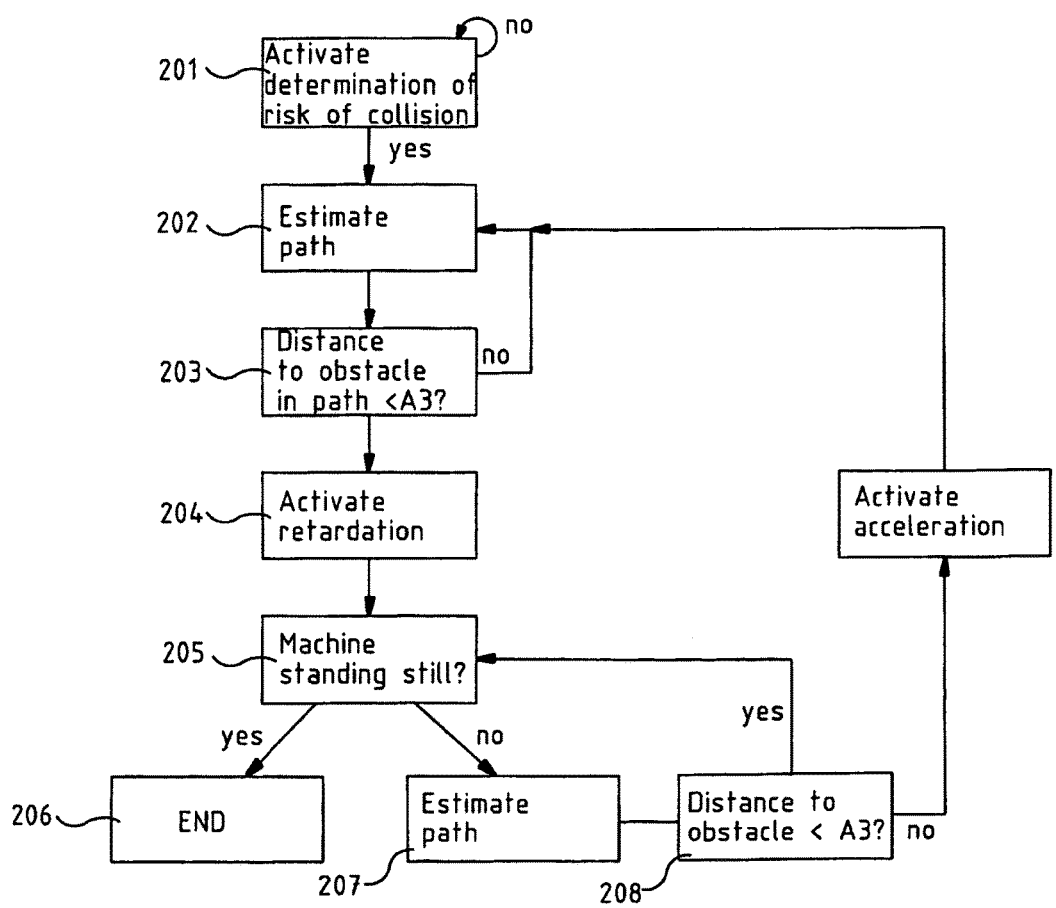

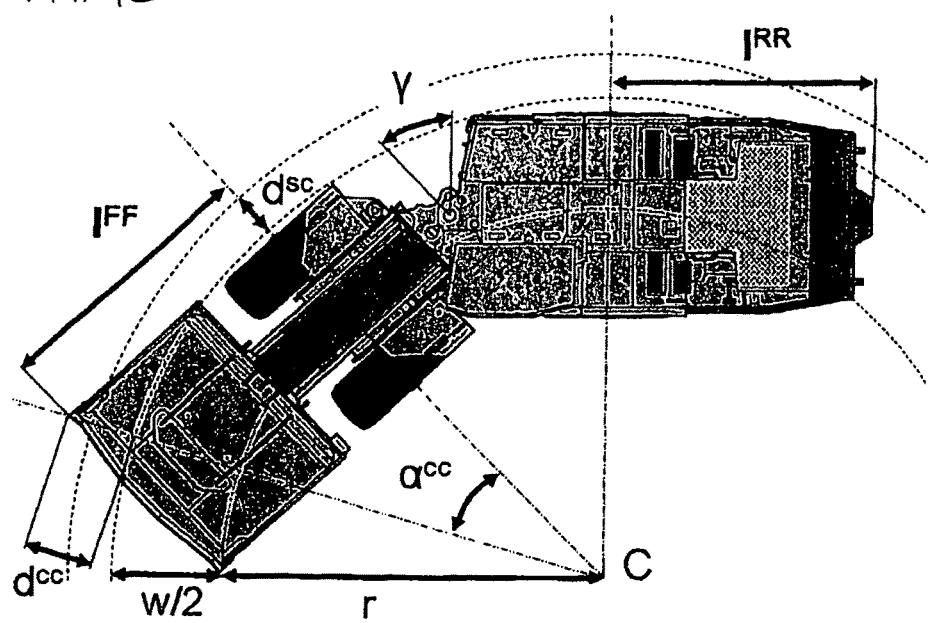

METHOD AND SYSTEM FOR DRIVING A MINING AND/OR CONSTRUCTION MACHINE

FIELD OF THE INVENTION

The present invention relates to the maneuvering of mining and/or construction machines, and in particular to a method for driving a mining and/or construction machine according to the preamble of claim 1. The invention also relates to a system and a mining and/or construction machine.

BACKGROUND OF THE INVENTION

In the fields of activities mining and tunneling, for example, there is a constant ongoing process of improving efficiency, productivity and safety. Examples of changes/improvements that are carried out to an increasing extent, in particular in mining (tunneling), is the automation, fully or partly, of various processes occurring in mining.

It is, for example, often desirable that at least part of the vehicles/machines that are used in mining/tunneling can be driven fully autonomous, i.e. without an operator being required to influence the steering. Autonomous operation, however, is not always suitable or even economically justifiable. This is true in particular in environments that constantly change, for example in certain types of mines where new galleries/drifts frequently arise, and older drifts can be refilled, which normally has an impact on autonomous operation of machines. This is because a setup of a fully autonomous solution normally is relatively time and resource consuming, and a new setup is at least partially required as soon as the environment in which the autonomous machine is driven changes.

In many situations, therefore, such machines are instead being driven by means of remote control, where the machine is driven without a driver, but where, instead, an operator, for example in a control room, controls the machine by means of suitable maneuvering means such as, for example, control sticks.

One example of vehicles/machines where remote control often is desirable consists of so called LHD (Load-Haul-Dump) machines. The driving of such machines belong to the more dangerous tasks that exists in mines, for example because they are often used to remove and transport broken rock/ore from, for example, a position where blasting has been performed to another position for further processing. The remote control consequently has the advantage that the operator can be removed from the dangerous environment in which the machine works to a considerably safer location such as, for example, a control room.

There are, however, situations when manual operation of the machine, i.e. where the machine is being driven by an operator present on the machine, is still required, or when other operation, such as remote control or autonomous operation, is not motivated for economical or other reasons.

Manual driving of machines can, however, at least in certain situations be associated with monotonous actions, with the risk of a lack of attention from the operator, and thereby associated accidents, as result.

SUMMARY OF THE INVENTION

It is an object of the present invention to provide a method for driving a mining and/or construction machine. This object is achieved by means of a method according to claim 1.

The present invention relates to a method for driving a mining and/or construction machine, where said machine is arranged to be controlled by an operator by means of maneuvering means, where said operator, when driving said machine, provides steering commands by means of said maneuvering means for maneuvering said machine. The method comprises, when said machine is being driven in an environment having at least a first obstacle:
- when said machine is within a first distance from said first obstacle, estimate a first path that has been requested by said operator by means of said steering commands,
- by means of a control system determining whether said machine when moving according to said requested first path will be driven within a second distance from said first obstacle, and
- when it is determined that said machine, when travelling according to said first path, will be driven within said second distance from said first obstacle, retard said machine by means of said control system.

The present invention is suitable, for example, in situations where an operator drives a machine, and where the machine is arranged to be maneuvered by the operator from a maneuvering position on board the machine for longer periods of time in surroundings where one or a plurality of surrounding obstacles are close.

For example, situations in mining exist where a machine is moved by an operator for a longer period of time and/or distance. For example, mining machines can be moved between a ground level and a level deep into ground, where the travel can take long time, in particular if the machine is a slow moving machine. This movement can result in a long travel distance, and in a very monotonous environment where the machine moves along a ramp in a spiral shape upwards or downwards through the mountain. It can be difficult in such situations for the operator to stay focused at all times, whereby the operator temporarily may suffer a lack of attention. This can, however, rapidly lead to a collision with surrounding obstacles, such as, for example, surrounding rock walls or other machines with damage as result. In severe cases such a collision may have the result that the machine will not be possible to move from the location by its own engine, but must be towed away, which can have as result that traffic in the ramp stops, whereby also production in the mine stops. Consequently, such collisions can become very expensive.

According to the present invention, however, such situations can be avoided by estimating, by means of the control system of the machine, the path requested by the operator, and retarding the machine when this path may lead to collision with an obstacle. The path can, for example, be estimated by determining the track that the machine will follow at the current steering angle (such as, for example, articulation angle (hinge angle) of an articulated machine or wheel angle where steering wheels are used). Collisions, for example, can then be avoided by determining whether the machine will be driven within a second distance from said first obstacle (or other obstacle when the/surroundings comprise a plurality of obstacles) by retarding the machine where it is determined that the machine will reach within said second distance, which, for example, can be set to 0.0 m, and consequently represent a collision. The retardation can, for example, be set to a retardation that has the result that the machine, where this is possible, is retarded to stand still before the machine reaches said obstacle, or a position within said second distance from said obstacle. Consequently, the retardation can be determined, e.g. based on said first distance and/or the current speed of the machine.

According to one embodiment, the machine is retarded as soon as it is detected that there is an obstacle in the path of the machine. This can, however, lead to an undesired number of retardations, for which reason the retardation according to one preferred embodiment is not started until said first distance to said first obstacle is below a third distance, i.e. the retardation is not unnecessarily activated, but only when the distance to the obstacle is such that retardation is really required. This third distance can, for example be determined at least partly based on the required stopping distance of the machine at the current speed, for example with the addition of a safety margin (offset), or alternatively, for example, be set to a set distance.

When determining distances to obstacles along said path, the path can be defined as an area in the direction of travel having a width corresponding to the width of the machine, so that obstacles within said area will have the result that the machine will be driven within said second distance from said first obstacle when travelling according to the requested path. That is, said second distance will in this case be set to 0. The width of said area can also be defined as a width corresponding to the width of the machine and a first lateral safety distance, where said lateral safety distance advantageously can be said second distance.

When a retardation has begun it can be determined whether the reduction in speed due to the retardation will have the result that the machine no longer will reach a position within said second distance from said obstacle, whereby an acceleration of the machine can begin and a new determination be carried out.

The method can also determine when the path requested by the operator is changed to another path, where the retardation can be aborted if the machine, when travelling according to said second path; will not be driven within said second distance from said first obstacle.

Said second distance can, for example, consist of a distance in the interval 0-0.5 meters, preferably in the interval 0-0.2 meters. The method can further be arranged to be carried out only when the machine is being driven with a speed exceeding a first speed, such as, for example, 0.5 m/s, 1 m/s or any other suitable: speed exceeding 0.1 m/s.

According to one embodiment, the operator can be notified that there is a risk of collision, which, for example, can be made by suitable sound/light signal.

The invention also relates to a device and a mining and/or construction machine.

BRIEF DESCRIPTION OF THE DRAWINGS

FIG. 1A-B shows a vehicle from the side and from the above, with which the present invention advantageously can be utilized.

FIG. 2 shows an exemplary method according to the present invention.

FIG. 4C shows an example of a steering angle dependent lateral safety distance when taking turns.

DETAILED DESCRIPTION OF AN EXEMPLARY EMBODIMENT

Figure 3:
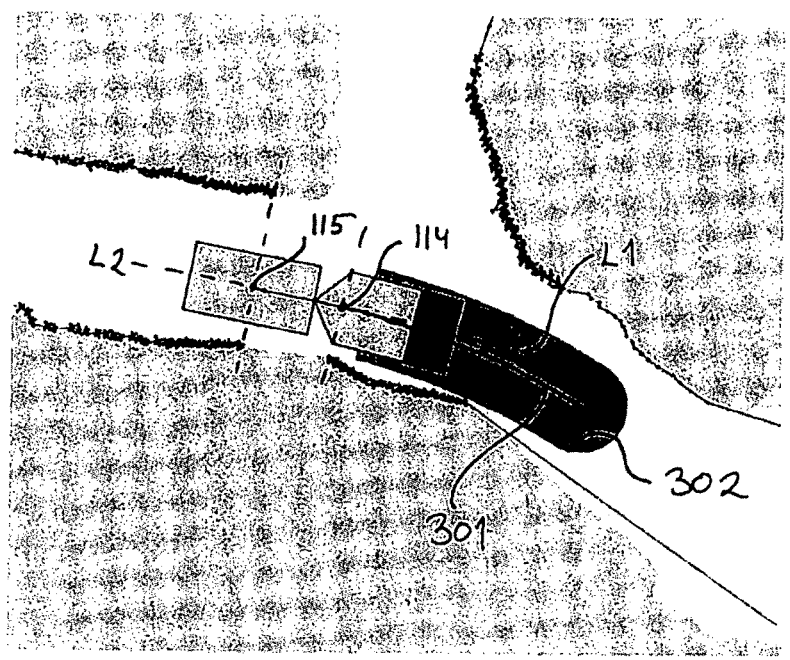
FIG. 3 shows an example of a representation of the machine shown in FIG. 1A-B in a representation of the surroundings.

As has been mentioned above, there exists situations that, e.g. due to lack from attention of the operator, can result in undesired collision. A method according to the invention for preventing a machine from colliding by retarding the machine before the machine collides, for example, with a rock wall, is exemplified below. The invention is exemplified for an exemplary machine 100 shown in FIG. 1A-B, which is shown from the side and from the above, and with which the present invention can be utilized. The machine 100 is a so called LHD-load machine and is used to load and transport away material, such as for example blasted rock or other masses by means of a bucket 101. The masses can, for example, be transported from one position far down underground to the surface for further processing. The invention, however, is very suitable at other kinds of machines, such as, for example, mine trucks. Mine trucks can be very large, and load hundreds of tons of material, and a collision involving a mine truck can result in a long period of standstill with large costs as result.

Returning to FIG. 1A-B, the machine 100 comprises, apart from the bucket 101, wheels 102-105 and a control system comprising at least one control unit 106 (FIG. 1B), which controls various of the functions of the machine. Machines of the disclosed kind can comprise more than one control unit, where each control unit, respectively, can be arranged to be responsible for different functions of the machine.

The disclosed machine 100 further constitutes an articulated vehicle, where a front portion 100a is connected to a rear portion 100b by means of a hinge 107. Consequently the machine is steered by means of articulated steering to facilitate maneuvering of the machine. An articulation angle sensor 110 transfers signals regarding current articulation angle to the control unit 106. The hinge 107 is further controlled by means of suitable control member/actuator (not shown). Machines of the disclosed kind are often driven in surroundings where the distance to surrounding rock walls is small which renders maneuvering of a non-articulated machine with conventional front and/or rear wheel steering difficult to perform. The invention, however, is suitable also for machines/vehicles of this kind. The disclosed machine further comprises laser range scanners 114, 115, the function according to the present invention being described further below. The machine also comprises a maneuvering position (operators compartment) comprising maneuvering means, such as, e.g. one or more control sticks, whereby the machine is arranged to be maneuvered by an operator from the said maneuvering position.

An exemplary embodiment 200 according to the present invention is shown in FIG. 2. The method begins in step 201, where it is determined whether a risk of collision according to the present invention is to be determined. If this is the case, the method continues to step 202. The transition from step 201 to step 202 can, for example, occur in any of the following situations: when the machine is started; when the machine starts moving; when the speed of the machine exceeds a first speed; when the movement of the machine has been in progress for a first time; or for any other suitable reason.

The expected path of the machine is estimated in step 202. This can, for example, be carried out by receiving one or more steering commands from the operator, where these steering commands at least comprise a representation of a steering angle command. The steering angle command can, for example, consist of a request for a specific steering angle, but also of a request for a steering angle change, where this steering angle change, for example, can constitute a speed at which the steering angle is to be changed. By means of said steering angle command the path of the machine is estimated, for example in the form of the track that the machine will follow at the steering angle represented by said steering command.

The estimation of the path of the machine and obstacles in relation to the path should be carried out often since laser data, articulation angle, speed and steering commands often change during operation. The method according to the present invention can therefore be arranged to be repeated by any suitable update frequency, such as, for example, an arbitrary time in the interval 0.1-1000 ms or any other suitable shorter or longer interval, perhaps preferably in the interval 0.1-200 ms so that the machine will not be able to move too far between updates of the path. Consequently, in each determination in step 202, a path (track) can be determined and evaluated for the current steering angle at this instant, so that a determination consequently can be performed also during an ongoing steering angle change since the steering angle can be considered to be constant during the short period of time, that a specific determination according to the present invention is performed. Said path can be approximated by a circular arc having a radius consisting of the turning radius of the machine at the current articulation angle. The circular arc can also have a first length, where this length, for example, can consist of any suitable length and be dependent of the speed of the machine, where a higher speed generates a longer length, or a length that is limited, for example, by the a range of distance meters according to the below, or a suitable number of meters. The length can, for example, be set to the distance A3 below.

When said path has been estimated, the method continues to step 203, where it is determined by means of the control system whether the machine when moving according to the estimated path will be driven in such a manner that the machine will get closer than a certain distance A2 to an obstacle within a certain distance A3. Said distance A2 can, for example, consist of a very small distance, such as a distance in the interval 0.0-0.5 meters. A distance A2 of 0.0 meters from said machine to an obstacle means a collision with said obstacle. The distance A3 is exemplified below.

Knowledge of obstacles in the surroundings of the machine is required in this determination. One method for obtaining this information is to determine the position of the machine in a representation of the surroundings by means of a suitable positioning system and then calculate the movement of the machine in said representation of the surroundings. This kind of determination can, however, be difficult to carry out, in particular, for example, in underground mines where distances to obstacles often are very short and a very good knowledge of the position of the machine in relation to the obstacles being present in the mine, such as, for example rock walls and also other machines, is required.

In order to obtain a correct picture of the position of the machine in relation to these obstacles, therefore, sensors arranged on the machine are used according to preferred embodiment to measure distances to surrounding obstacles, where these sensors, for example, can consist of a front 114 and a rear 115 laser range scanner, which are also connected to the control unit 106, and which delivers sensor signals representing measured distances, i.e. distances to the closest obstacle that stops the laser beam.

The machine 100 is graphically illustrated in FIG. 3 with the laser range scanners 114, 115, and the laser range scanners 114, 115 can, for example, be arranged to measure the distance in certain directions in an angular range. According to the present example, laser range scanners are used, which measure the distance to the closest object in the longitudinal forward direction of the front portion 100a (and in the longitudinal rearward direction of the rear portion 100b, respectively) and the distance to the closest object (such as rock) for each full degree ±90° from the longitudinal directions L1, L2 (see FIG. 3), respectively. Each laser range scanner, consequently, measures 181 points of measuring, respectively. The distances are measured in one plane (e.g. on the height of the laser at right angles from the vertical line of the machine, alternatively in a horizontal direction from the laser position), the so called laser plane.

As is realized, laser range scanners that measure distances in a considerably larger number of directions can of course be used, i.e. also for fractions of degrees and/or larger angular ranges than the stated ±90°. Conversely, the laser range scanners can be arranged to measure distances in fewer directions, i.e. having a larger distribution between the directions, i.e. sparser than at each degree and/or for a smaller angular range than the stated ±90°. Furthermore, a single omnidirectional laser can be used instead, and/or lasers for measuring in a plurality of planes. Other distance meters being suitable for the purpose can also be used instead of using lasers.

The machine 100 is graphically represented in a representation of the surroundings of the machine in FIG. 3, in this case a T-crossing in a mine. The impacts of the laser beams on surrounding obstacles are marked by "x", where each "x" represents a distance measurement in one direction from a laser range scanner.

The laser range scanners consequently continuously generate a set of distances to obstacles in the surroundings of the machine, as seen from the current position of the machine, i.e. as soon as the machine has moved, new distances will be measured.

These measured distances are then used to determine distances to obstacles in the surroundings of the machine in relation to said path. One example of a path, starting from the front axle of the machine in the direction of travel, is illustrated in FIG. 3, where the disclosed line 301 in front of the machine consequently represents the expected path of the machine for the center of the front axle of the machine in the direction of travel at the current steering command.

According to the above, it is calculated in step 203, by means of the laser distance measurements and the estimated path, whether a machine will get too close to or collide with surrounding obstacles. In this calculation it is, however, not enough to determine distances from the line 301 that represents the path of the machine. This is because the machine by definition has a certain width, and all parts of the machine must clear the obstacle and not only the line 301 that represents the path of the center of the front axle of the machine in the direction of travel. According to the present invention, therefore, the path is expanded laterally to an area 302 that defines the area that must be free from obstacles in order for the machine to be able to travel according to the path without collision. A fundamental rule when forming this area is that the path is expanded by half the width of the machine in each direction from the line 301.

Figure 4A:
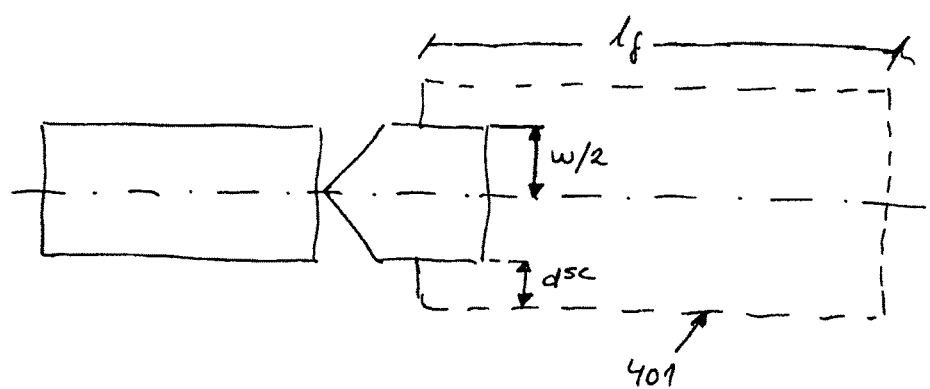
FIG. 4A shows an example of a lateral safety distance.

In addition, a lateral clearance distance is preferably added, which, for example, can be dependent on the current speed of the machine. This lateral clearance distance can, e.g., consist of the distance A2 above. This is illustrated in FIG. 4A, where the machine is shown having the width w and lateral clearance distance denoted as $d^{sc}$. The marked area 401 represents the expanded path, stated with a length $l_f$. This offset $d^{sc}$ ensures that the machine can navigate along the route that is defined by the path, even with some deviation, without this resulting in a risk of collision. The lateral clearance distance $d^{sc}$ can consequently be speed dependent and, for example, consist of a suitable distance in the order of 0.05-0.3 meters at low speeds, and 0.4-1 meter or more at higher speeds. The requirement of a clearance distance can also be different in dependence of the turning angle. If obstacles are present within the lateral clearance distance the machine, consequently, will be driven closer to an obstacle than the distance A2.

Figure 4B:
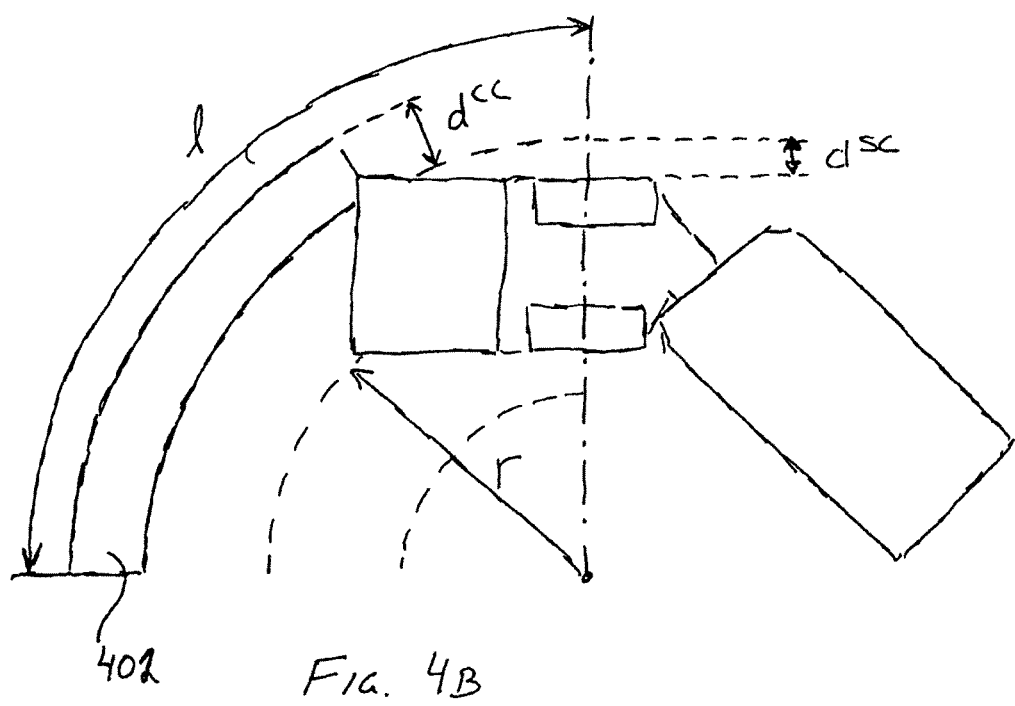
FIG. 4B shows an example of a lateral safety distance when taking turns.

When the machine turns, it must also be ensured that the machine does not hit the outer wall. On machines with an overhang in front of the front wheel axle in the direction of travel, such as e.g. a bucket, the outer corner of the machine can reach outwards past the lateral clearance distance $d^{sc}$. Therefore, either the lateral clearance distance $d^{sc}$ must take this into account or, alternatively, a further margin that depend on the turning radius of the path is required. This is illustrated in FIG. 4B with turning margin $d^{cc}$, 402. This additional turning margin $d^{cc}$ that is required on the outer side of the machine can be calculated using the turning radius r, the distance from each axle, respectively, to the corners $l^{FF}$ and $l^{RR}$, respectively, and the machine width w and the Pythagorean theorem as $$d^{cc} = \sqrt{(r+w/2)^2 + (l^{xx})^2}$$

where $l^{xx}$ corresponds to $l^{FF}$ if the machine is driven in a forward direction, and $l^{RR}$ if the machine is reversed. The turning radius r, the distance from each axle to corresponding corner $l^{FF}$ and $l^{RR}$, and the machine width is defined in FIG. 4C. The area where the additional turning margin $d^{cc}$ is utilized is further restricted to only be valid in the area in front of the machine as is disclosed in FIG. 4B. By limiting the area in which the extra turning margin $d^{cc}$ is applied, the method becomes very useable in narrow tunnels in mines. By increasing the safety margin only when required, such as during turning, the safety margin can be kept as small as possible when travelling in directions straight ahead and when travelling at small turning angles. If the safety margin would have to take the "worst case" into account at all times, the machine would many times not be able to be driven without obstacles occurring within the safety distance and thereby the path according to the above, with the result that the machine would unnecessarily be stopped according to the present invention. The calculation of the angle $\alpha^{cc}$, which is shown in FIG. 4C, and which defines in front of which angle the turning margin $d^{cc}$ is to be used is trivial, and can, for example, be carried out according to: $\tan(\alpha^{cc}) = l^{xx}/(r+w/2)$, where r and w are defined according to the above.

By means of the expanded path, a determination whether obstacles occur in the path or not can thereby be carried out, and which takes into consideration the actual width of the machine and which takes a safety distance into consideration.

This determination can be performed according to the following.

Figure 5A:
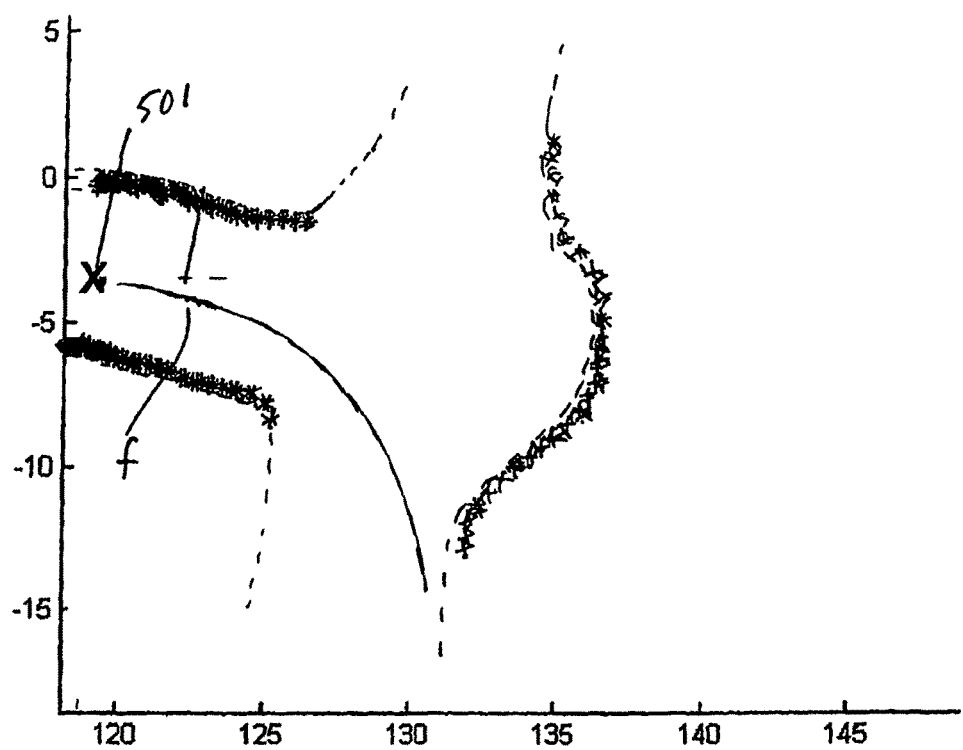
FIG. 5A shows an example of a path with distance data to surrounding obstacles according to the present invention.

In FIG. 5A the path 501 of the machine is shown for an exemplary situation where the machine is travelling in a certain direction of travel. The path is represented by a circular arc having a radius corresponding to the turning radius of the machine. The disclosed machine is further at a position where it reaches a T-crossing (for the sake of understanding the rock walls are indicated by dashed lines), i.e. FIG. 5A represents another situation than the situation shown in FIG. 3. The path f starts from a point 501, which in this example constitutes the center of the front axle of the machine. Data from the laser scanners, or in this case the front laser scanner in the direction of travel, are indicated as stars, "*", in the figure. As in FIG. 3, each star ("x" in FIG. 3) consequently represents a distance measurement in one direction from the laser scanner, and these stars consequently represent distances to the schematically indicated rock walls. The estimated path 501 (in expanded form according to the above) is compared with sensor data from the laser scanner to determine the distance to a first obstacle, and for how long the machine can be driven before an obstacle occurs in the path of the machine.

Figure 5B:
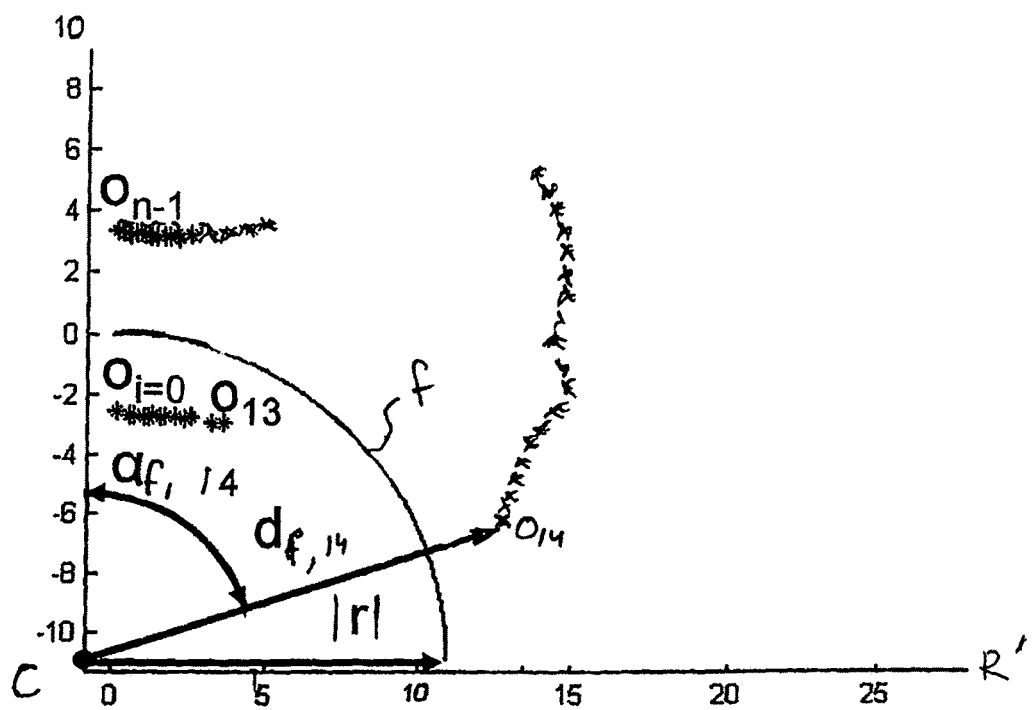
FIG. 5B shows the path of FIG. 5A in a system of coordinates where the origin coincides with the starting point of the path, and the x-axis is parallel to travelling straight forward in the longitudinal direction of the machine.

The distance to the closest obstacle of the path can be calculated in a simple manner according to the following, where the example starts from the path f shown in FIG. 5A. All obstacles, i.e. laser measurements, are first transformed to a coordinate system having the origin in the start point of the path (501 in FIG. 5A) and an x-axis being parallel to the path of the vehicle when it is driven in a direction straight ahead, see FIG. 5B. $d_{f,i}$, such as, for example, $d_{f,14}$, (see FIG. 5B) constitutes the distance from the center of the circular arc of path f to obstacle (laser measurement) $o_i$, and can be calculated as $$d_{f,i} = \sqrt{x_i^2 + (y_i - r_f)^2},$$ where $r_f$ represents the radius of the path.

Note that the radius of paths that turn to the right (in this example), are defined as negative numbers. $\alpha_{f,i} = \arcsin(x_i/d_{f,i})$ is the corresponding angle along the circular periphery of the path, and can together with the radius of the path be used to calculate the distance to obstacles, and thereby the length of the path that is free from obstacles. The distance to a lateral obstacle (such as laser measurement $o_{14}$) along path $\Delta_{f,14}$, can consequently generally be calculated as $$\Delta_{f,i} = d_{f,i} - |r_f|.$$

For as long as $\Delta_{f,i}$ exceeds the desired distance $d_{f,i}^C$ (i.e. half the machine width w/2 with the addition of the lateral safety distance $d^{sc}$ and possible additional turning margin $d^{cc}$ according to FIG. 4B-C) for each obstacle i, where $d_{f,i}^C$ is calculated as:

$$d_{f,i}^C = \begin{cases} 0 & \alpha_{f,i} < 0 \\ w/2 + d^{sc} + d^{cc} & \Delta_{f,i} > 0 \wedge \alpha_{f,i} > \alpha_f^{cc} \\ w/2 + d^{sc} & \text{otherwise} \end{cases}$$

the obstacle i in relation to path f is outside the expanded path, and the path is thereby drivable in relation to laser measurement i.

The shortest distance to an obstacle within the expanded area of a path, i.e. within the radius of the path with the addition and subtraction of the lateral safety distance, can be determined for each path by comparing the distances to the various laser measurements for each path.

If there are further obstacles within the area of the expanded path, the drivable length $l^0$ of the path can be determined as: $l_f^0 = r_f \alpha_{f,i_{min}}$, i.e. the radius of the path multiplied with the angle to the closest obstacle (expressed in radians), which can be determined by using a representation according to FIG. 5B.

For as long as the distance $l^0$ of the path exceeds a distance A3, which, for example, consists of the smallest distance that is required to stop the machine, preferably with the addition of an offset, the path is drivable and continued travel is therefore allowed without further actions. The distance A3 consequently constitutes the smallest distance that the machine must be able to be driven without obstacles if a measure according to the invention shall not be taken. If the distance $l^0 \geq A1$ the method therefore returns from step 203 to step 201 for a new determination. If, on the other hand, the distance to an obstacle is smaller than A3 the method continues to step 204 to retard the vehicle according to the invention. According to the present invention, the vehicle is consequently retarded if it is established that the current path leads to an obstacle within a distance A3. According to an alternative embodiment the machine is retarded as soon as it is detected that an obstacle occurs in the path of the machine. This can, however, result in an undesired number of retardations, for which reason the retardation according to one embodiment is not started until the distance to the first obstacle is smaller than some suitable distance, such as A3, so that the retardation is not unnecessarily started but only when it is really necessary. This distance can be determined based on a required stopping distance at the current speed, or alternatively be set, for example, to some suitable distance.

The magnitude of the retardation is set such that the machine with certainty can be braked to a full stop before the obstacle is reached. The method then continues to step 205, where it is determined if the machine has been braked to a full stop, in which case the method is ended in step 206. If it is determined in step 205 that the machine is not standing still the method continues to step 207 where the path of the machine is again determined according to the above, wherein in step 208 it is determined whether the distance to the closest obstacle still is below the distance A3. This condition can have changed, e.g. due to a new steering command from the operator, or because the reduction in speed due to the retardation has reduced the demand for lateral clearance distance/stopping distance, whereby a previous obstacle no longer necessarily constitutes an obstacle. For as long as the distance still is below the distance A3, the method returns to step 205 to determine if the machine has stopped. If it is determined in step 208 that the distance to the closest obstacle no longer is below the distance A3, the retardation is stopped and the method continues to step 209 where an acceleration is activated to again control the speed towards the speed requested by the operator. This acceleration can, for example, be set to some suitable value such that the increase in speed is carried out with a desired speed, and can, for example, be dependent on the difference between the speed that at present prevails due to the retardation and the speed that is requested by the operator, or simply be controlled by the power requested by the operator. The method then returns to step 202 for a new estimation of a path according to the above with possible new following retardation and so on.

The invention consequently provides a method that in an efficient manner can avoid undesired collisions. Furthermore the present invention can be utilized to drive the machine with higher speed since the operator is given support to dare increasing the speed since the control system directly will retard the machine if a risk of collision arises.

In addition to the above a signal can be generated, for example in the form of a sound and/or light signal to alert the driver that the machine is being retarded, whereby the operator can contribute to the reduction of the risk of collision for example by actively activate further brake power or change direction of travel.

The invention has so far been described in connection to an underground mine. The invention, however, is also suitable for example in tunneling and other applications where a mining and/or construction machine is utilized. Accordingly, the invention is applicable also in applications above ground. The invention is also suitable for other kinds of vehicles than articulated vehicles.

The invention has so far been described in connection with laser range scanners for generating the representation of the surroundings. It is not, however, essential to the invention that the representation of the surroundings is determined by means of laser range scanners, but arbitrary distance meters can be used for as long as these can provide distance measurements having acceptable accuracy.

Consequently, the invention is not limited other than in regard of what is stated in the appended claims.

The invention claimed is:

1. Method for driving a mining and/or construction machine, where said machine is arranged to be controlled by an operator by means of maneuvering means, where said operator, when driving said machine, provides steering commands by means of said maneuvering means for maneuvering said machine, wherein the method comprises, when said machine is being driven in an environment having at least a first obstacle, the steps of:
   when said machine is within a first distance from said first obstacle, estimating a first path that has been requested by said operator by means of said steering commands,
   by means of a control system determining whether said machine when moving according to said requested first path will be driven within a second distance from said first obstacle, and
   when it is determined that said machine, when traveling according to said first path, will be driven within said second distance from said first obstacle, retard said machine by means of said control system;
   wherein, when determining said first distance to said first obstacle in said requested first path, said path is defined as an area in the direction of travel having a first length and a width corresponding at least to the width of the machine, where obstacles within said area have the result that the machine will be driven within said second distance from said first obstacle when traveling according to said requested path;
   wherein the width of said area is defined as a width corresponding to the width of the machine and a first lateral safety distance; and
   wherein said first lateral safety distance is a lateral safety distance being different from zero.

2. Method according to claim 1, wherein said first distance constitutes a representation of a distance from a position on said machine to said first obstacle.

3. Method according to claim 1, further comprising:
   during said retardation, retarding said machine to a full stop before said machine reaches a position within said second distance from said first obstacle.

4. Method according to claim 1, further comprising, based on said first distance, determining a retardation for retarding said machine.

5. Method according to claim 1, further comprising:
   determine a representation of said first distance from said machine to said first obstacle, and
   commence said retardation when said first distance to said first obstacle is below a third distance.

6. Method according to claim 5, where said third distance is determined at least partially based on a required stopping distance for said machine at a current speed.

7. Method according to claim 1, wherein said lateral safety distance of said machine is set to different values for each side of said machine, respectively.

8. Method according to claim 7, wherein said difference in safety distance at least partially is determined by said operator.

9. Method according to claim 1, wherein the safety distance on the outer side of the machine when turning is dependent on the turning angle and/or speed of the machine.

10. Method according to claim 9, wherein the steering angle dependent safety distance is dependent of the length of the machine in front of the front wheel axle in the direction of travel.

11. Method according to claim 9, wherein the safety distance on the outer side of the machine when turning, which is dependent on the turning angle of the machine, is applied only in front of the machine.

12. Method according to claim 1, further comprising, during an ongoing retardation:
determine whether the path requested by the operator is changed to a second path being different from said first path, and
interrupt said retardation if said machine when traveling according to said second path will not be driven within said second distance from said first obstacle.

13. Method according to claim 1, wherein said second distance is a distance in the interval 0-0.5 meters, preferably in the interval 0-0.2 meters.

14. Method according to claim 1, further comprising: determining whether said machine will be driven within a first distance from said first obstacle when said machine is being driven with a speed exceeding a first speed.

15. Method according to claim 1, wherein said estimated path is estimated based on a steering angle command.

16. Method according to claim 1, wherein said distance to said obstacle is determined by means of sensors arranged on said machine.

17. Method according to claim 1, wherein said maneuvering means are arranged at said machine, and wherein said machine is arranged to be maneuvered from a maneuvering position onboard said machine.

18. Method according to claim 1, further comprising the step:
generating a signal to notify said driver that said vehicle is being retarded.

19. Method according to claim 1, wherein said environment comprises a plurality of obstacles, where the method further comprises:
by means of said control system determining whether said machine when moving according to said first path will be driven within said second distance from at least one of said plurality of obstacles, and
when said machine, when traveling according to said path, will be driven within said second distance from at least one of said plurality of obstacles, retard said machine.

20. Method according to claim 1, wherein said machine is an articulated machine.

21. Method according to claim 1, wherein said path is estimated as the track that said machine will follow at the current steering command given by said operator.

22. Method according to claim 1, wherein said path is estimated as the track that said machine will follow at the current steering angle or ongoing steering angle change, such as articulation angle/articulation angle change of an articulated machine.

23. Method according to claim 1, wherein said machine is a machine intended for transportation of broken rock/ore.

24. System for driving a mining and/or construction machine, where said machine is arranged to be controlled by an operator by means of maneuvering means, where said operator, when driving said machine, provides steering commands by means of said maneuvering means for maneuvering said machine, wherein the system comprises means for, when said machine is being driven in an environment having at least a first obstacle:
when said machine is within a first distance from said first obstacle, estimate a first path that has been requested by said operator by means of said steering commands,
by means of a control system, determining whether said machine when moving according to said requested first path will be driven within a second distance from said first obstacle, and
when it is determined that said machine, when traveling according to said first path, will be driven within said second distance from said first obstacle, retard said machine;
wherein, when determining said first distance to said first obstacle in said requested first path, said path is defined as an area in the direction of travel having a first length and a width corresponding at least to the width of the machine, where obstacles within said area have the result that the machine will be driven within said second distance from said first obstacle when traveling according to said requested path;
wherein the width of said area is defined as a width corresponding to the width of the machine and a first lateral safety distance; and
wherein said first lateral safety distance is a lateral safety distance being different from zero.

25. Mining—and/or construction machine, wherein said mining—and/or construction machine comprises a system according to claim 24.

* * * * *